(12) United States Patent
Alexander et al.

(10) Patent No.: US 11,337,027 B2
(45) Date of Patent: May 17, 2022

(54) ZONING CONFIGURATION IN A MESH NETWORK

(71) Applicant: TEXECOM LIMITED, Haslingden (GB)

(72) Inventors: Peter Alexander, Haslingden (GB); Clym Brown, Haslingden (GB)

(73) Assignee: TEXECOM LIMITED, Haslingden (GB)

( * ) Notice: Subject to any disclaimer, the term of this patent is extended or adjusted under 35 U.S.C. 154(b) by 134 days.

(21) Appl. No.: 16/644,474

(22) PCT Filed: Sep. 3, 2018

(86) PCT No.: PCT/GB2018/052482
§ 371 (c)(1),
(2) Date: Mar. 4, 2020

(87) PCT Pub. No.: WO2019/048837
PCT Pub. Date: Mar. 14, 2019

(65) Prior Publication Data
US 2020/0288266 A1 Sep. 10, 2020

(30) Foreign Application Priority Data

Sep. 5, 2017 (GB) ..................................... 1714246

(51) Int. Cl.
*H04W 4/021* (2018.01)
*H04B 17/318* (2015.01)
(Continued)

(52) U.S. Cl.
CPC .......... *H04W 4/021* (2013.01); *H04B 17/318* (2015.01); *H04L 5/0055* (2013.01);
(Continued)

(58) Field of Classification Search
CPC ..... H04W 4/029; H04W 84/18; H04W 4/025; H04W 40/32; H04W 16/18; H04W 40/20; H04W 88/10
See application file for complete search history.

(56) References Cited

U.S. PATENT DOCUMENTS 6,744,740 B2 * 6/2004 Chen ....................... H04L 45/26
370/255
8,824,444 B1 9/2014 Berenberg
(Continued)

FOREIGN PATENT DOCUMENTS

WO 2013/017300 A1 2/2013
WO 2016/089944 A1 6/2016

OTHER PUBLICATIONS

Singh et al., "A Tree Based Routing Protocol for Mobile Sensor Networks (MSNs)" International Journal on Computer Science and Engineering, vol. 02, No. 01S, 2010; pp. 55-60.
(Continued)

*Primary Examiner* — Kwasi Karikari
(74) *Attorney, Agent, or Firm* — Schwabe, Williamson & Wyatt, PC

(57) ABSTRACT

A wireless mesh network comprises a controller and a plurality of wireless networked devices arranged to transmit messages to and receive messages from the controller. The plurality of devices are arranged in zones, such that a device that is arranged to communicate directly with the controller is designated a "Zone 1" device and a device that is arranged to communicate with the controller via a "Zone 1" device is designated a "Zone 2" device. One or more or each of the plurality of devices periodically sends a positioning message to the controller to determine its zone and if it can communicate directly with the controller it determines that it is a "Zone 1" device and if it cannot communicate directly with the controller, but it can communicate with the controller via (Continued)

a "Zone 1" device and therefore arranged to do so, it determines that it is a "Zone 2" device.

19 Claims, 7 Drawing Sheets

(51) Int. Cl.
*H04W 4/38* (2018.01)
*H04L 5/00* (2006.01)
*H04W 4/02* (2018.01)
*H04W 4/12* (2009.01)
*H04W 84/18* (2009.01)

(52) U.S. Cl.
CPC ............ *H04W 4/025* (2013.01); *H04W 4/12* (2013.01); *H04W 4/38* (2018.02); *H04W 84/18* (2013.01)

(56) References Cited

U.S. PATENT DOCUMENTS

| | | |
|---|---|---|
| 2006/0023677 A1 | 2/2006 | Labrador |
| 2011/0268013 A1 | 11/2011 | Levendel |
| 2013/0197955 A1* | 8/2013 | Dillon .................. H04W 40/12 705/7.13 |
| 2013/0279409 A1 | 10/2013 | Dublin, III |
| 2014/0028468 A1* | 1/2014 | Grady .................... G08C 15/00 340/870.03 |
| 2016/0330107 A1 | 11/2016 | Thubert |

OTHER PUBLICATIONS

Patent Cooperation Treaty: International Search Report and Written Opinion for PCT/GB2018/052482 dated Nov. 22, 2018; 15 pages.

* cited by examiner

ZONING CONFIGURATION IN A MESH NETWORK

CROSS-REFERENCE TO RELATED APPLICATION

The present application is a national phase entry under 35 U.S.C. § 371 of International Application No. PCT/GB2018/052482, filed Sep. 3, 2018, which designates the United States of America, which claims priority to GB Application No. 1714246.4, filed Sep. 5, 2017, the entire disclosures of each of these applications are hereby incorporated by reference in their entireties and for all purposes.

TECHNICAL FIELD OF THE INVENTION

The present invention relates to mesh networks, in particular to mesh networks of sensor devices and especially, but not exclusively to communication between battery powered sensor devices in a mesh network and a controller.

BACKGROUND TO THE INVENTION

WO2013/017300 discloses a method for improving performance and reducing power consumption of a wireless network arrangement by arranging devices into "zones" and funnelling data to a controller through the arrangement of zoned devices.

Once devices have been arranged into zones in accordance with the method, the devices assimilate and store data indicating successful communication routes between devices and then transmit signals along those successful routes. This arrangement avoids signals being transmitted laterally between devices in the same zone, as devices disregard messages being sent to the controller from devices within the same zone, or closer to the controller.

Messages continue to follow successful communication routes back and forth to the controller, so the network is working in a similar manner to a point-to-point network, but with the back-up of a mesh network operational principle if the pre-established route is unsuccessful.

This arrangement is very good in reducing the power consumption in a network of battery powered sensor devices which are permanently positioned and required to regularly send information to a predetermined controller.

However, this disclosure provides no suggestion for how to deal with devices (or the controller) moving within the network. It is taught that if a "zone 3" device fails to transmit a message back to the expander via one particular "zone 2" device, it can attempt to transmit the message via an alternative pathway, such as via an alternative "zone 2" device. It is also taught that non-adjacent devices can "jump over" other devices because devices are capable of selectively responding to messages in accordance with previously successful communications and also in response to changes in the network arrangement such as communication failures.

The present invention seeks to provide a mesh network and a method of operating such a network that is capable of responding to moving devices and/or movement of the controller.

SUMMARY OF THE INVENTION

In broad terms, the invention relates to a mesh network comprising a controller and a plurality of networked devices arranged to transmit signals to and receive signals from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device; wherein, in response to a physical movement of the controller and/or the networked devices, the mesh network re-determines the zone designations of the devices.

According to a first aspect of the present invention there is provided a wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device; wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device.

This allows for a device to dynamically change its zone designation depending on the result of the positioning message. Accordingly, the system can be responsive to changes in location of the devices and/or the controller, whilst maintaining the power-saving benefits of zone-based operation set out in the prior art. This allows for use of the mesh network of the invention in systems where the arrangement of the controller and the devices is not fixed. For example, in a domestic/industrial security system where the controller is moveable, such as in securing scaffolding on a building site, which may be moved around the site as work is carried out, or from site to site; or outside the security setting, for example in a safety setting, such as in gas-detection.

Importantly, the positioning messages are sent periodically, and not just in response to failure to send a message along an existing route, in order to "self-heal" if an intended route cannot be followed. This means that a Zone 2 device can be redesignated as a Zone 1 device, if it becomes capable of communicating directly with the controller. This reduces the overall power demand of the mesh network, since messages from a Zone 1 device do not need to be forwarded by another (Zone 1) device.

It is also important to note that the positioning messages are concerned with position in the zone arrangement, and could also be referred to as "zone positioning messages", although the shorter "positioning messages" is used herein. They are not concerned with arbitrary geographical position, but with position in the zonal arrangement, determined by ability to connect directly with the controller, or the number of other intermediate devices required to be able to communicate with the controller.

This method can also accommodate movement of the networked devices, or fluctuations in signal strength which affect communication routes.

Ability to communicate with the controller or another networked device may be determined by measuring the strength of a signal to/from the controller or other networked device. The measured strength may be compared to a predetermined threshold signal strength and ability to communicate may be determined when the measured strength is equal to, or exceeds the threshold.

Thus the method may comprise the step of the controller receiving a positioning message, comparing a received signal strength with a threshold and sending an acknowledgement only if the signal strength is above the threshold.

One or more or each device may periodically send a polling message to the controller including data such as the status of said device. One or more or each polling message may comprise (or be) a positioning message, and the controller may react to one or more or every polling message by comparing the received signal strength with a threshold and sending an acknowledgement if the signal strength is above the threshold.

Every message sent from one or more or each device to the controller may comprise a positioning message. In this way, whenever there is an opportunity to improve the zonal arrangement of the system, by designating a device in the lowest possible zone, that opportunity can be taken.

Alternatively a proportion of the total number of messages sent from one or more or each device to the controller may comprise a positioning message. For example, at least 10%, at least 20%, at least 30%, at least 50%, or at least 75% of all messages sent from one or more or each device to the controller may comprise a positioning message.

Instead of a proportion, the frequency of sending of positioning messages may be defined. For example one or more or each device to the controller may send a positioning message at least once per month, once per week, once per day, once per hour or once per minute.

In particular, each device may be configured to compare the zone of the source device, the zone of the destination and their own zone designation, and where the zone of the destination is lower than the zone of the source, to ignore, and not forward the message (and optionally turn to an inactive state) if their own zone designation is equal to, or higher than, the zone of the source. In this way power consumption is reduced and the mesh network is not cluttered by excessively repeated messages.

Conversely, each device may be configured to compare the zone of the source device, the zone of the destination and their own zone designation, and where the zone of the destination is higher than the zone of the source, to ignore, and not forward the message (and optionally turn to an inactive state) if their own zone designation is equal to, or lower than, the zone of the source. This also reduces power consumption and avoids cluttering the mesh network with excessively repeated messages.

The mesh network may be arranged such that each device waits for a predetermined period after sending each positioning message, and in the absence of an acknowledgment within the period or after a predetermined number of consecutive absences of acknowledgement (for example 1, 2 or 3 repeated unacknowledged positioning messages), determines that it is no longer in its designated zone, nor a lower zone.

Each device may be configured such that having determined that it is no longer in its designated zone, but is not in a lower zone, it increments its zone designation (i.e. a device designated "Zone 1", redesignates itself as "Zone 2") then resends a positioning message to the controller comprising its new putative redesignated zone. In this way, devices in zone 1 will no longer ignore the positioning message, but any such devices within range will forward it to the controller and on receiving an acknowledgment, the source device can confirm that it has become a Zone 2 device.

One or more or each positioning message may comprise: source information identifying the device that is the source of the positioning message; destination information identifying the apparatus that the positioning message is destined for (for example the controller, or another device in the network); intended route information indicating the route that the message is intended to take; optionally recorded route information populated by any one or more intermediate device between the source and the destination that forwards the message and identifying each of said one or more intermediate devices; and the designated zone of the source device.

The positioning message may further comprise the designated zone of each intermediate device. Each intermediate device may populate the message with this information and include it when forwarding the message Intended route information may comprise identifiers identifying any intermediate devices intended to forward the positioning message. The intended route information identifying intermediate devices intended to forward the positioning message may be generated based on the last successful message sent between the destination and the source, in particular based on the last successful message from the destination to the source.

Where intended route information is included, each device may be configured to compare the zone of the source device, the zone of the destination, their own zone designation and the zone of the sending device which sent the message (i.e. either the source or an intermediate, forwarding, device) to said each device; and where the zone of the destination is lower than the zone of the source, to ignore, and not forward the message (and optionally turn to an inactive state) if their own zone designation is equal to, or higher than, the zone of the sending device, or if their zone is only one less than the sending device and they are not the intermediate device identified. In this way power consumption is yet further reduced as even devices inward of the sending device do not forward the message if they are not required to, as a device in the same zone is going to send the same message.

Additionally/alternatively, where intended route information is included, each device may be configured to compare the zone of the source device, the zone of the destination, their own zone designation and the zone of the sending device which sent the message (i.e. either the source or an intermediate, forwarding, device) to said each device; and where the zone of the destination is higher than the zone of the source, to ignore, and not forward the message (and optionally turn to an inactive state) if their own zone designation is equal to, or lower than, the zone of the sending device, or if their zone is only one more than the sending device and they are not the intermediate device identified. In this way power consumption is yet further reduced as even devices outward of the sending device do not forward the message if they are not required to, as a device in the same zone is going to send the same message.

The positioning message may be populated by any intermediate devices to comprise the received signal strength indicating the signal strength of the message received by each such intermediate device.

The controller may send an acknowledgement in response to the positioning message, to the device that was the source of the positioning message.

The device that was the source of the positioning message may determine its zone on the basis of the acknowledgement message. In particular, the device that was the source of the positioning message may confirm or redetermine its zone on the basis of the acknowledgement message. Each device may save its designated zone to memory. It may save its zone information to memory based on the acknowledgment message and may overwrite any previous zone information with the zone information based on the acknowledgement message.

The acknowledgement message may comprise an intended route from the controller to the device that was the source of the positioning message. The intended route may be the recorded route from the source device to the controller and the intended route from the controller may not be the intended route from the source device to the controller. In particular, the intended route from the controller to the source device may be the recorded route from the source device to the controller, where that recorded route is shorter than the intended route from the source device to the controller.

In one particular embodiment, the mesh network may be configured such that the controller receives a positioning message directly from one of the devices defined as a source device, that is designated a "Zone 2" device, the message comprising source information identifying the device that is the source of the positioning message; destination information identifying the controller that the positioning message is destined for; intended route information indicating the route that the message is intended to take and including the information identifying a "Zone 1" device intended to forward the message; and no recorded route information populated by any such intermediate device between the source and the destination; and the designated zone, "Zone 2", of the source device; the controller being configured to compare the intended route information with recorded route information, and having determined that they are different, to compare received signal strength with a threshold, and configured to determine that the received signal strength is above a threshold and accordingly to send an acknowledgement message direct to the source device; wherein the acknowledgement message comprises an intended route from the controller to the device that is the recorded route direct between the device and the controller; whereby, on receipt of the acknowledgement direct from the controller, with no fields populated by intermediate devices, the source device updates its zone designation, such that it is designated a Zone 1 device.

The controller may be a control panel or "expander" and the mesh network may be an alarm network. The control panel or expander may comprise a user interface, or be arranged for connection via an input/output to a user interface.

The networked devices may comprise sensors. The sensors may be gas sensors or may be security sensors (such as movement sensors or sensors capable of sensing opening/closing of a door/window or the like).

The networked devices may be arranged in zones such that a device which is not able or arranged to connect directly with the controller, nor via a "Zone 1" device, but is able and arranged to communicate with the controller via a "Zone 2" device is designated a "Zone 3" device. This arrangement may extend to devices that are arranged to communicate with the controller via a "Zone 3" device being designated as "Zone 4" devices, those that communicate with the controller via "Zone 4" devices being designated "Zone 5" and so on.

One or more or each of the plurality of devices may periodically send a positioning message to the controller to determine its zone and if it is not able to communicate directly with the controller or a "Zone 1" device, but is able to communicate with the controller via a "Zone 2" device, it may determine that it is a "Zone 3" device.

One or more or each of the plurality of devices may periodically send a positioning message to the controller to determine its zone in the same manner set out above and if it is only able to communicate via a "Zone 3" device (not directly, or via a "Zone 1" or "Zone 2" device), it may determine that it is a "Zone 4" device. The same method may be used to determine that a device is a "Zone 5" device.

Preferably the plurality of networked devices comprise supervised devices and at least one non-supervised device and preferably the controller periodically receives a message indicative of the online/offline status of the supervised devices and reacts to an unexpected offline status.

Preferably the plurality of networked devices comprises permanent supervised devices and at least one temporary device.

The temporary device, or each of a plurality of temporary devices may periodically send a positioning message to the controller to determine its zone.

The permanent devices may also periodically send a positioning message to the controller to determine their respective zones. The period between positioning messages may be shorter for temporary devices than for permanent devices. For example the temporary devices may send positioning messages at least twice, ten times, or 100 times more frequently than permanent devices.

This increased frequency reduces the likelihood of the or each temporary device getting lost, or sending messages via an unnecessary large number of other nodes, if it has moved to a closer zone, whilst sending the positioning message infrequently reduces the power consumption of the permanent devices.

Permanent devices may be provided in fixed location relative to each other and temporary devices may be freely movable.

At least one temporary device may be a temporary unsupervised device. For example, a key-fob, or a hand-held device, comprising a screen and an input, for example provided as a mobile telephone programmed with a suitable application.

At least one temporary device may be a temporary supervised device, for example a "man-down" device. The temporary supervised device, may include information such as for example its attitude or speed, determined for example by an accelerometer in messages sent to the controller, which may also comprise positioning data and thus be positioning messages.

The reaction to the unexpected offline status may for example be to add a count to a counter, which may trigger an alarm once a certain count has been reached; to sound an alarm; to send a notification; or to send a polling message to the device that has an unexpected offline status.

According to a second aspect of the invention there is provided a controller for a mesh network according to the first aspect of the invention (optionally including any optional features thereof), the controller configured to periodically receive a positioning message from a source device in the mesh network to determine the zone of the source device; the positioning message comprising source information identifying the device that is the source of the positioning message; optionally destination information identifying the controller as the destination that the positioning message is destined for; intended route information indicating the route that the message is intended to take; recorded route information populated by any one or more intermediate device between the source and the destination that forwards the message and identifying each of said one or more intermediate devices; and the designated zone of the source device; the controller configured to compare the intended route with the recorded route and where the recorded route is shorter than the intended route (i.e. includes fewer intermediate devices), to compare the received signal strength to a threshold, and where the received signal strength is above the threshold, to send an acknowledgement along the recorded route, such that the source device and any intermediate devices can update their zone designation.

The controller of the second aspect of the invention may comprise any features of the controller set out in relation to optional features of the first aspect of the invention.

According to a third aspect of the invention there is provided a wireless network device for a mesh network according to the first aspect of the invention (optionally including any optional features of the first aspect of the invention and optionally for communication with a controller according to the second aspect of the invention), the device configured to periodically send a positioning message to the controller to determine its zone; the positioning message comprising source information identifying the device that is the source of the positioning message; optionally destination information identifying the controller as the destination that the positioning message is destined for; and intended route information indicating the route that the message is intended to take; and the designated zone of the source device; the device configured to receive an acknowledgement message from the controller, the acknowledgement message comprising acknowledgement-source information identifying the controller as the source of the acknowledgement message; intended acknowledgement-route information identifying the route that the acknowledgement message is intended to take, and recorded acknowledgement-route information identifying the recorded route that the message has taken from the controller to the device; the wireless network device configured to compare the recorded acknowledgement route with the intended route of the positioning message and where the recorded acknowledgement route is shorter than the intended route (i.e. includes fewer intermediate devices), to compare the received signal strength to a threshold, and where the received signal strength is above the threshold, to update its zone designation based on the number of intermediate devices (if any) between the device and the controller, such that if it received the acknowledgement direct from the controller it determines that it is a "Zone 1" device and if it received the acknowledgement via a "Zone 1" device it determines that it is a "Zone 2" device; the wireless network device optionally configured store the new zone designation to memory and optionally to store the recorded route to memory as a new intended route for future transmission from the device to the controller.

The wireless network device of the third aspect of the invention may comprise any features of the devices set out in relation to the first aspect of the invention—for example it may be configured to periodically send a polling message to the controller including data such as the status of said device and comprising the positioning message and/or every message sent from the device to the controller may comprise a positioning message.

The wireless mesh network devices may be battery powered. The controller may be wired to by mains electricity or another other non-battery power source, such as supplied by a building (e.g. solar power, or other on-site power generation means).

The invention also extends to a method of operating a wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device; wherein, the method comprises the step of one or more or each of the plurality of devices periodically sending a positioning message to the controller to determine its zone and if it is able to communicate directly with the controller determining that it is a "Zone 1" device and if it is not able to communicate directly with the controller, but it is able to communicate with the controller via a "Zone 1" device and therefore arranged to do so, determining that it is a "Zone 2" device.

The method of operation may comprise any feature of the first aspect of the invention.

Moreover, the invention extends to a method of operation a controller for a mesh network according to the first aspect of the invention (optionally including any optional features thereof), the method comprising periodically receive a positioning message from a source device in the mesh network to determine the zone of the source device; the positioning message comprising source information identifying the device that is the source of the positioning message; optionally destination information identifying the controller as the destination that the positioning message is destined for; intended route information indicating the route that the message is intended to take; recorded route information populated by any one or more intermediate device between the source and the destination that forwards the message and identifying each of said one or more intermediate devices; and the designated zone of the source device; wherein the method comprises comparing the intended route with the recorded route and where the recorded route is shorter than the intended route (i.e. includes fewer intermediate devices), comparing the received signal strength to a threshold, and where the received signal strength is above the threshold, sending an acknowledgement along the recorded route, such that the source device and any intermediate devices can update their zone designation.

The method of operation can comprise any feature of the controller of the first or second aspect of the invention.

Additionally, the invention extends to a method of operation of a wireless mesh networked device in a mesh network according to the first aspect of the invention (optionally including any optional feature thereof) the method comprising periodically sending positioning message to the controller to determine the zone of the device; the positioning message comprising source information identifying the device that is the source of the positioning message; optionally destination information identifying the controller as the destination that the positioning message is destined for; and intended route information indicating the route that the message is intended to take; and the designated zone of the source device; the device configured to receive an acknowledgement message from the controller, the acknowledgement message comprising acknowledgement-source information identifying the controller as the source of the acknowledgement message; intended acknowledgement-route information identifying the route that the acknowledgement message is intended to take, and recorded acknowledgement-route information identifying the recorded route that the message has taken from the controller to the device; the method further comprising: receiving the acknowledgement message from the controller; comparing the recorded acknowledgement route with the intended route of the positioning message and where the recorded acknowledgement route is shorter than the intended route (i.e. includes fewer intermediate devices), comparing the received signal strength to a threshold, and where the received signal strength is above the threshold, updating the zone designation of the device based on the number of intermediate devices (if any) between the device and the controller; the method comprising determining that it is a "Zone 1" device if the acknowledgement was received direct from the controller; and determining that it is a "Zone 2" device and if it received the acknowledgement via a "Zone 1" device; the method optionally comprising storing the new zone designation to memory and optionally comprising storing the recorded route to memory as a new intended route for future transmission from the device to the controller.

The method of operation can comprise any feature of the mesh networked device(s) of the first or second aspect of the invention.

DETAILED DESCRIPTION OF THE INVENTION

In order that the invention may be more clearly understood embodiments thereof will now be described, by way of example only, with reference to the accompanying drawings, of which:

Figure 1:
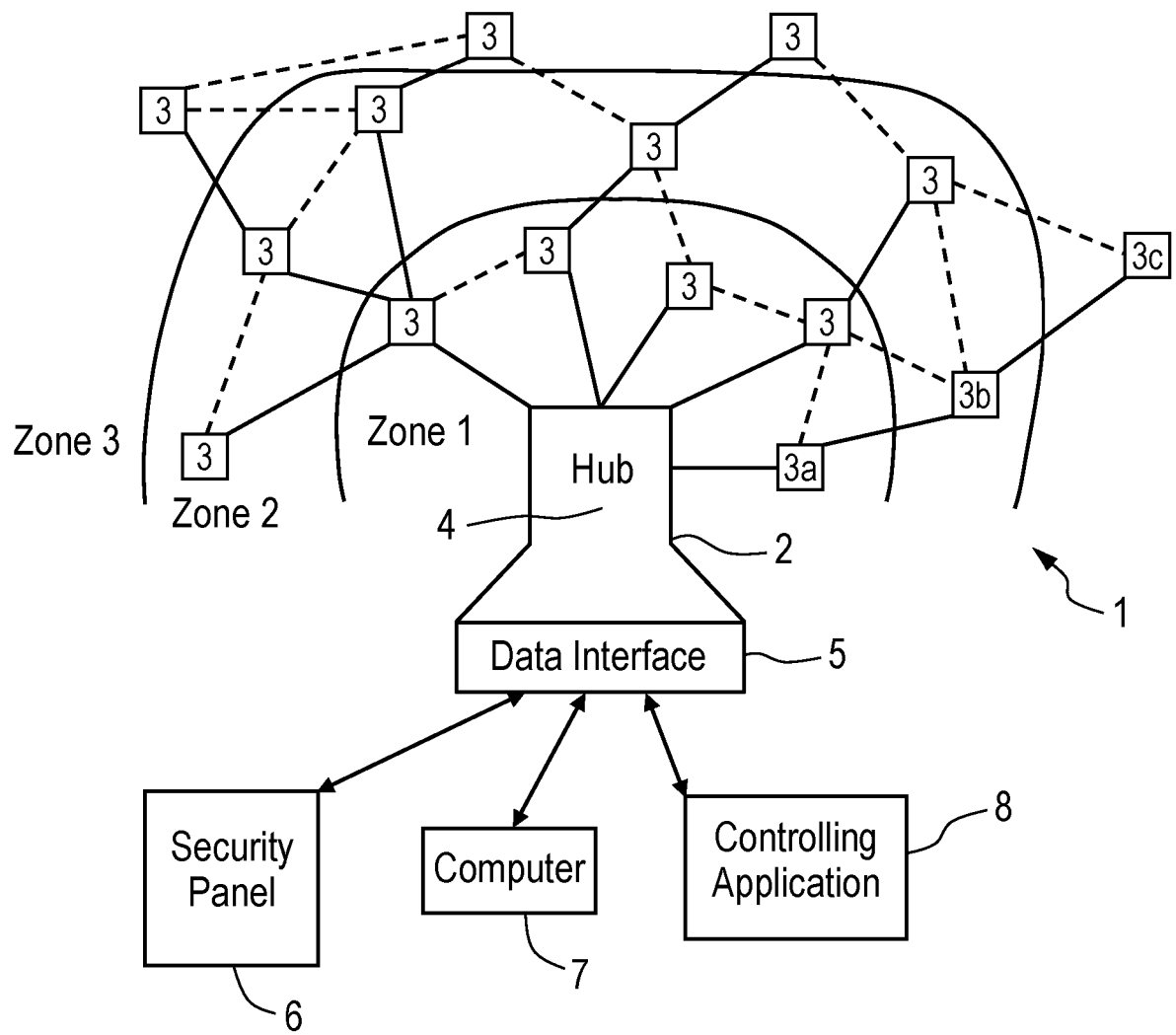
FIG. 1 is a schematic diagram of a mesh network in accordance with the invention.

With reference to the figures, in particular FIG. 1, an exemplary mesh network 1 in accordance with the invention is shown. The mesh network 1 is described in the context of an alarm system, but those skilled in the art will appreciate that the invention could be used in numerous other applications.

The mesh network 1 comprises a controller 2 and a series of wireless mesh-networked devices 3, or nodes. The mesh-networked devices 3 are arranged in a series of zones on the basis of the minimum number of devices required to forward a message from them to the controller 2. Thus, a Zone 1 device 3 can communicate directly with the controller 2, a Zone 2 device 3 can only communicate with the controller 2 via at least one other (Zone 1) mesh networked device, and a Zone 3 device 3 can only communicate with the controller 2 via at least two other mesh networked devices 3 (one in zone 2 and the other in zone 1).

In FIG. 1, one device 3 designated Zone 1 is numbered 3a, one device 3 designated Zone 2 is numbered 3b and one device 3 designated Zone 3 is numbered 3c.

A mesh network 1 is a network topology in which each node relays data for the network. All mesh-networked devices 3 cooperate in the distribution of data in the network.

The mesh-network 1 of the invention uses a routing technique to propagate messages between the controller 2 and the mesh-networked devices 3 via wireless signals.

Messages are sent along the routes requiring the lowest number of re-transmissions—hence, in the figure each node 3 in zone 2 or 3 is connected to a node in a more inward zone (zone 1 or 2) with a full line, indicating a preferred route. Dotted lines are also shown, indicating where signal strength is sufficient for communication with other nodes, but routes along dotted lines will not be used unless a preferred route fails and the mesh network 1 self-heals.

The controller 2 includes a hub 4, which controls the mesh-networked devices 3, receiving periodic poll messages from them, to check that they are functional, arming them, and receiving messages from them concerning changes in status, e.g. sensor data, which are of course generated randomly.

The controller 2 also includes a data interface 5, through which it communicates with a security panel 6, computer 7, controlling application 8 (e.g. on a smartphone or the like), in order to communicate with a user, e.g. so as to receive arm/disarm signals via any of the security panel 6, computer 7, controlling application 8 (e.g. on a smartphone or the like), and to send alerts to a user via the same devices, or via the devices to other parties (such as through the security panel to the police force, or a private security company, or to an external sounder, not shown).

Figure 2:
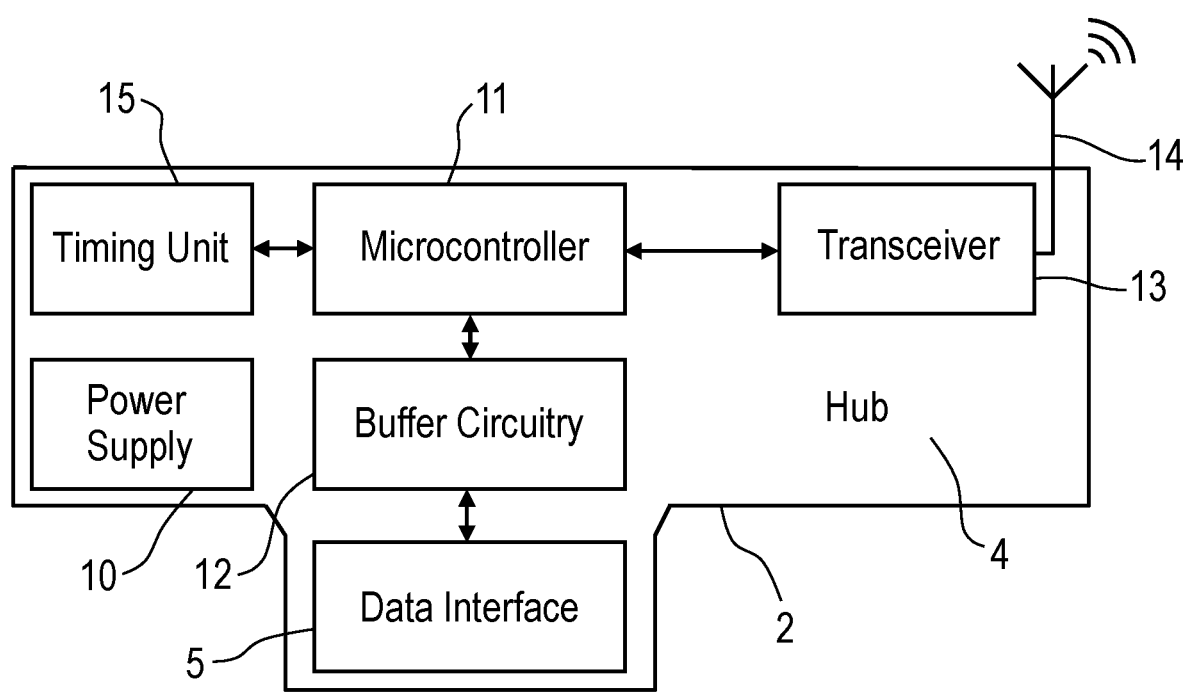
FIG. 2 is a schematic diagram of a controller of the mesh network of FIG. 1.

As shown in FIG. 2, the hub 4 of the controller 2 comprises a power supply 10, typically an external power supply, with in-built backup batteries/capacitors, a microcontroller 11, programmed to process signals received and sent by the controller 2, and buffer circuitry 12, through which the hub 4 outputs signals to, and receives signals from the data interface 5.

Additionally, the hub 4 comprises a transceiver 13, through which (via antenna 14) the controller sends and receives signals so as to exchange messages with the mesh-networked devices 3. The microcontroller 11 is also connected to a timing unit 15, which includes a watch crystal, so as to maintain a master clock.

Figure 3:
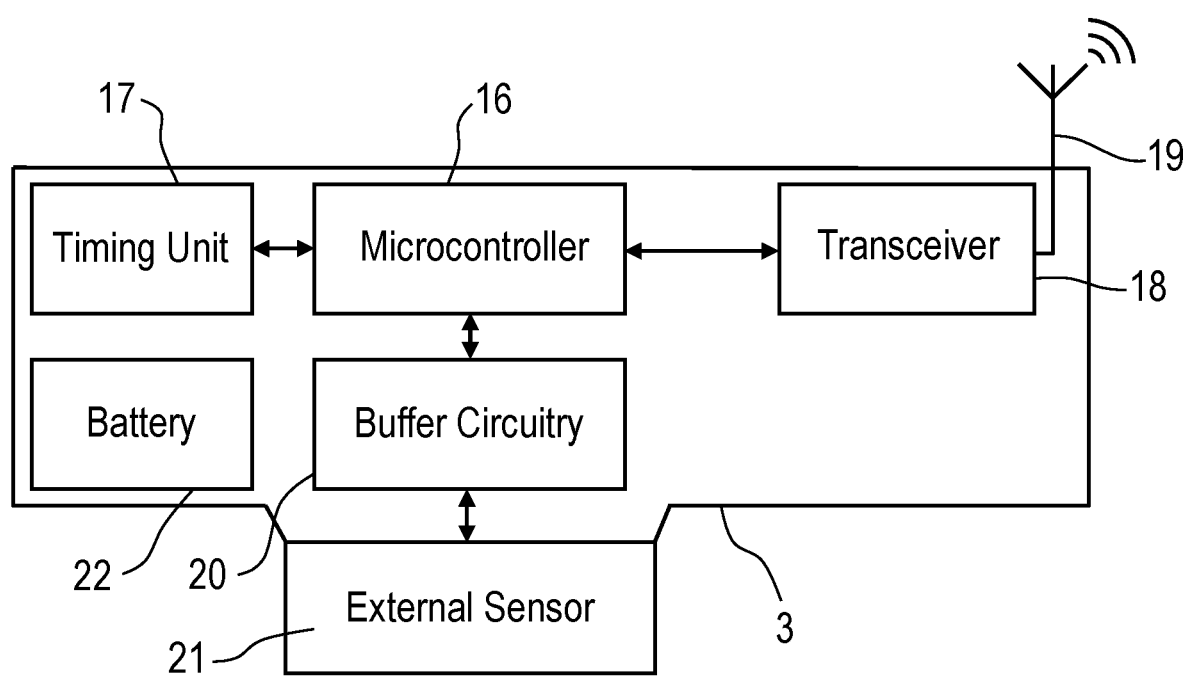
FIG. 3 is a schematic diagram of a mesh networked device of FIG. 1.

Like the controller 2, the mesh-networked devices 3, shown in FIG. 3, comprise a microcontroller 16 to process signals sent and received by the mesh-networked device, a timing unit 17 including a watch crystal, in order to independently maintain time, and a transceiver 18 through which (via antenna 19) the mesh-networked devices 3 send and receive signals so as to exchange messages with other mesh-networked devices 3 and/or the controller 2. Like the controller 2, the mesh-networked devices 3 have buffer circuitry 20, but in this instance, the buffer circuitry is provided to interpret signals received from a sensor 21, such as a light sensor, door sensor, or the like.

The mesh-networked devices 3 of this embodiment of the invention are battery-powered wireless devices, hence, whereas the controller 2 is provided with a battery-backed up external power supply, the mesh-networked devices 3 comprise batteries 22. Provision of battery power, rather than external power, makes setting up a mesh-network 1 (i.e. installing the mesh-networked devices 3) much more straightforward, but means that low power consumption is highly desirable.

In order to consume a minimum amount of power, each mesh networked device 3 is arranged to turn to an inactive state when it receives a message from a device 3 in the same zone or further in that is destined for a device further in or the controller 2, which is innermost. Correspondingly, each mesh networked device 3 is arranged to turn to an inactive state when it receives a message from a device 3 in the same zone or further out that is destined for a device further out. This avoids unnecessary forwarding of signals which would waste energy.

Additionally, each device is arranged to update its designated zone every time it sends (or forwards) a polling message by including fields in the message indicating where the message is in its route to the destination and comparing the signal strength of received transmission with a minimum threshold. In this way, each device can ensure it is in the lowest possible zone, such that messages it generates or messages intended for it are forwarded by as few other devices as possible.

Typically messages are sent only between given source devices 3 to provide information on their status etc. and the controller 2, not between devices 3. Thus having as many devices in as low zone as possible at all times has a significant effect on the amount of time any given device 3 must be active.

These are the fields in the data packet:

Z0, Z1, Z2: The zone that the devices 3 forming the route are in. Z0 is always populated by the source unit with Z1 and Z2 being populated by the forwarding devices as and when this happens.

RSSI0: The received signal strength of the message received by the first forwarding device 3. If there is no first forwarding device 3, this field is left at zero.

RSSI1: The received signal strength of the message received by the second forwarding device 3. If there is no second forwarding device 3, this field is left at zero.

Data: The data being transmitted in the packet. This is not relevant to the discussion of the method of the invention, but included for completeness. It may for example be the status of the device 3 (e.g. armed/disarmed), or a reading from the external sensor 21 of the device.

For simplicity, the unique identifiers 3$a$, 3$b$ and 3$c$ are designated to the three networked devices in the examples below whilst the source is given the unique identifier 2. In practice, these unique identifiers could be (for example) MAC addresses.

RSSI fields are always populated by any receiving device 3 and can only be seen if the message is forwarded. RSSI values can vary between −40 and −100 with −40 being the strongest signal. A typical threshold used to determine whether a signal was strong enough to be reliable may be −90 dB. −80 dB is used in the following examples to show a signal with OK strength.

The destination device will also measure the received signal strength of the message it receives or RSSI2— however, this signal strength will not be transmitted, since the message has reached its destination. It is, however, compared to a threshold, as discussed below.

Messages contain intended route fields populated by the sender and recorded route fields populated by the devices doing the forwarding so at any point it can be seen where the message is on its intended route. By including both an intended route and a recorded route, short cuts can be taken by messages if the signal strength is good enough allowing the zone arrangement to be updated in real time.

Including the zone information of the devices allows the zone structure to form and for a device to be able to "ask for help" from devices in lower zones in the event that the message cannot be transmitted along the intended route owing to a problem with a device 3 along the intended route.

| Source | Destination | R0 | R1 | RR0 | RR1 | Z0 | Z1 | Z2 | RSSI0 | RSSI1 | Data |
|--------|-------------|----|----|-----|-----|----|----|----|-------|-------|------|

Source: The device number where the message has originated from. As is conventional, each device 3 in the system as well as the controller 2 will have its own unique identifier. The source field includes this unique identifier.

Destination: The unique identifier of the device or controller where the message needs to go. Where the destination is the controller, this will generate an acknowledgement signal.

R0, R1: The unique identifiers of the devices 3 (if any) forming the route that the message is intended to take. This is populated by the sender and based on the last successful message. Both fields are zero for a direct message and R1 is zero for a message with only one forwarding device 3.

RR0, RR1: The unique identifiers of devices 3 (if any) forming the route that the message has actually taken. These fields are set to zero when the message is initially transmitted by the source. They populated by the forwarding devices 3 with their unique identifiers as messages are forwarded.

The manner in which the network operates and the devices 3 determine their zones can be understood from the following examples:

For the sake of the discussion below, an earlier set-up has already taken place, in which the device 3$a$ has determined that it is in zone 1, and can communicate directly with the controller 2, the device 3$b$ has determined that it is in zone 2 and can communicate with the controller via the device 3$a$, and the device 3$c$ has determined that it is in zone 3 and can communicate with the controller via devices 3$a$ and 3$b$.

Figure 4:
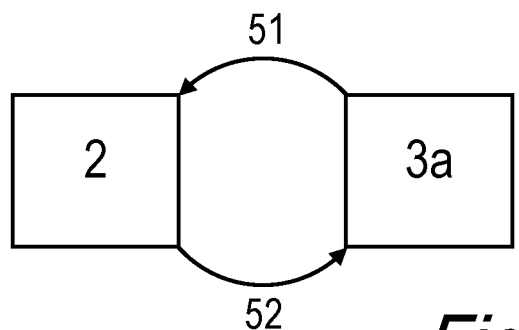
FIG. 4 is a schematic diagram showing transmission of messages between certain mesh networked devices shown in FIG. 1.

For example, with reference to FIG. 4, that can have been by the device 3$a$ initially attempting to send a message 52 directly to the controller 2 with a putative 1 (indicating that it is in zone 1) in the message 51 as set out below, seeking acknowledgement.

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 51 | 3a | 2 | — | — | — | — | 1 | — | — | — | — | ... |
| 52(ACK) | 2 | 3a | — | — | — | — | 0 | — | — | — | — | ... |

The zone 1 device would receive an acknowledgement as shown as 52 and learn that it is in zone 1, saving that zone information to its memory in the microcontroller 16 (but which of course could be separate).

Figure 5:
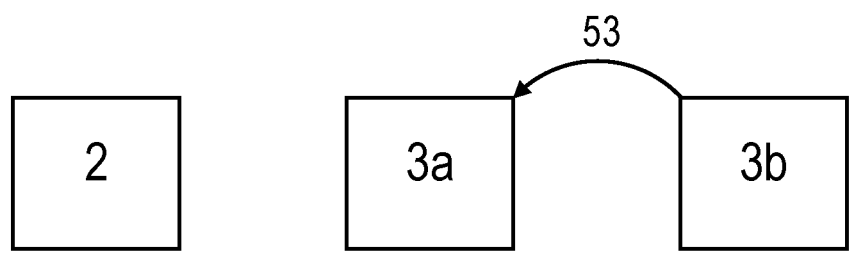
FIG. 5 is a schematic diagram showing transmission of messages between certain mesh networked devices shown in FIG. 1.

With reference to FIG. 5, the zone 2 device 3b would make the same attempt to communicate directly, sending the following message:

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 53 | 3b | 2 | — | — | — | — | 1 | — | — | — | — | ... |

But as it is outside the range of the controller 2, no reply from the controller would be forthcoming. Any other devices receiving the message would read it and note that it is destined for the controller and sent by a device apparently in zone 1, therefore, they would ignore it, as it does not appear to need to be forwarded.

The device 3b would then try again, to see whether it is in zone 2, this time sending the following message 54, in which the Z0 field is putatively set to 2, to indicate that the source is in zone 2:

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 54 | 3b | 2 | — | — | — | — | 2 | — | — | — | — | ... |

The zone 1 device 3a would receive and read this positioning message, learning that it is destined to the controller and sent from a zone 1 device and would therefore check that the signal strength is adequate to form a link with the device 3b (i.e. above the threshold of −90 dB), populate the RR0 field with its unique identifier, 3a, to indicate that it is the first forwarding device, and the Z1 field to indicate that it, the first forwarding device 3a, is in zone 1 and populate the RSSI0 field with −80 to indicate the strength of the signal it received.

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 55 | 3b | 2 | — | — | 3a | — | 2 | 1 | — | −80 | — | ... |

The controller 2 would receive this message 55, check the signal strength RSSI2 of the received message 55 and compare it with the threshold to ensure that it is adequate, for example determining that it is −80 and therefore above the threshold.

In FIG. 1, it can be seen that there is another device 3 in zone 1 which would also be within range of the zone 2 device 3b and forward a similar message including its own identifier (not shown) to the controller 2. On receipt of these two messages, the controller would determine based on the signal strengths RSSI0 and RSSI2 of the signals between the source 3a and the controller 2 on both routes, which is more stable (has a higher minimum or total signal strength), and would choose the preferred route to send the acknowledgement.

Thus an acknowledgement as follows would be sent as message 56. In this message, the source is shown as the controller 2, the destination is device 3b, and the intended forwarding device field R0 is populated with the unique identifier 3a, to instruct that particular device (rather than any other zone 1 device 3) to forward the message.

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 56(ACK) | 2 | 3b | 3a | — | — | — | 0 | — | — | — | — | ... |

The acknowledgement 56 would be received by the first forwarding device 3a in zone 1, the fields populated and the message forwarded accordingly, as message 57, with the RR0 field for the first forwarding device on the recorded route populated with its unique identifier 3a, the Z1 field for the zone of the first forwarding device populated with 1 and the and the received signal strength populated with −80 indicating that the strength of the signal received from the controller 0 is −80, as shown below.

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 57(ACK) | 2 | 3b | 3a | — | 3a | — | 0 | 1 | — | −80 | — | ... |

The zone 2 device 3b would then save its zone, zone 2, to memory, since it had confirmed by successful receipt of the acknowledgement that it is indeed in zone 2. Additionally, the zone 2 device would save the details of the last successful route from the controller (i.e. via device 3a) to memory to use as the intended route for future messages to the controller.

Of course, those skilled in the art will immediately appreciate from the above that the same technique would be used for the zone 3 device 3c, first going through the step of initially attempting to send a message like message 53, but with its own unique identifier 3c directly to the controller 2 with a putative 1 (indicating that it is in zone 1) and receiving no acknowledgement; next trying again, to see whether it is in zone 2, this time sending the a message like message 54, in which the Z0 field is putatively set to 2, to indicate that the source is in zone 2, again receiving no response, since the zone 3 device 3c is not within range of any zone 1 devices; then finally sending a message putatively indicating that it is in zone 3, which would of course elicit a response from the controller via devices 3b and 3a.

It will also be appreciated that the technique could be extended to further zones, simply by including additional intended route, recorded route, zone and received signal strength fields in the messages for the third and any other forwarding devices.

We turn now to operation of the devices after setting up, in particular showing how movement of the controller and the wireless devices 3 can be accommodated.

Example 1

Figure 7:
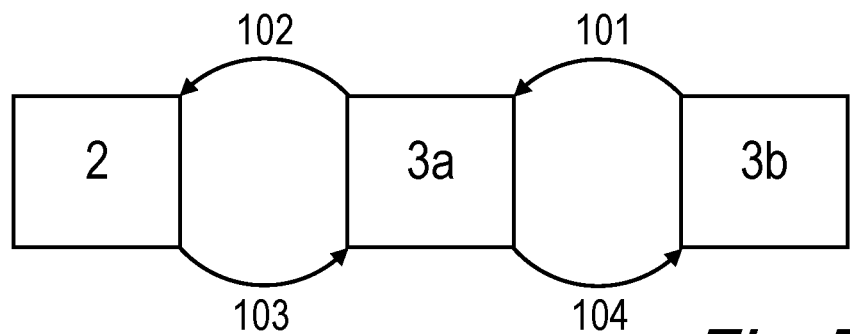
FIG. 7 is a schematic diagram showing transmission of messages between certain mesh networked devices shown in FIG. 1.

Example 1 shown in FIG. 7 shows a polling message being sent from a Zone 2 device 3b to the controller 2, via a zone 1 device 3a, and an acknowledgement being generated and following the same route back. In this example, we deal only with two devices, one in each of zone 1 and zone 2.

In this example, the following messages 101, 102, 103, 104 are sent:

In message 101, the source device 3b (with the unique identifier 3b) in zone 2 is sending the message via an intermediate device 3a in zone 1 (with the unique identifier 3a) to the controller 2, with the unique identifier 2 so the destination is filled with a 2 and the R0 field is populated with 3a. R1 is left blank as there is no second hop. Both RR0 and RR1 are also left blank as the message has not been forwarded by anything yet.

Z0 (the zone of the source device 3b) is populated with 2 to indicate that the device is in Zone 2.

In message 102, the zone 1 device 3a has received the message and seen that is it required to forward it to the controller 2. In order to indicate that this has happened, it fills in its own unique identifier, 3a, into the recorded route field, RR0 and then forwards the message.

The controller 2 receives message 102 and in messages 103 and 104, the same process is repeated, in reverse, for the acknowledgement.

This is normal operation, with the messages passing back and forth from the Zone 2 device 3b to the controller 2 (in zone 0), via the zone 1 device 3a.

Each time, on receipt of the message via the zone 1 device 3a, the zone 2 device 3b confirms that it is in zone 2, updating that field in the memory on its microcontroller 16 by overwriting the previous data, and also saving the recorded route (via device 3a), for use as the intended route of its next communication to the controller 2.

Figure 8:
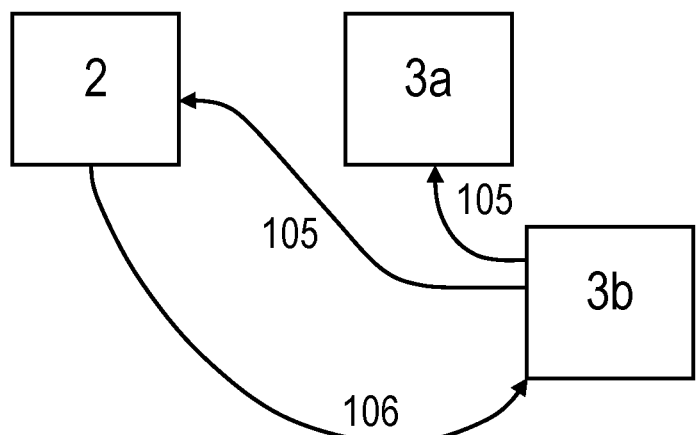
FIG. 8 is a schematic diagram showing transmission of messages between certain mesh networked devices shown in FIG. 1.

The dynamic updating of a zone is explained with reference to FIG. 8. Here, the zone 2 device 3b is shown closer to the controller 2. This may be as a result of a physical movement of the controller 2 towards the device (for example to wire the controller to a control panel or keypad at a new entrance to the building), or it may be due to movement of the device 3b towards the controller 2 (as may be the case if the device 3b is a "man down" device, attached to a vulnerable person to monitor their movement (or lack of movement)) or perhaps a restructuring of the building in which the devices 3 are arranged, for example the removal of a wall between the controller and the zone 2 device 3b. Whatever the reason, the device 3b that is designated zone 2, and has that zone information saved to its memory, has now become within range of the controller 2, such that it is able to communicate directly with the controller 2 (i.e. in zone 1).

Thus, the next time a periodic polling signal is sent, say a message 105 confirming the status of the device 3b, it (as usual) contains positioning information, notably its zone and the unique identifier of the zone 1 device 3a, that is to forward the message (of course it will be appreciated that the zone could be determined based on the number of devices R0, R1 if any that are intended to forward the message 105, in this case one device 3a).

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 101 | 3b | 2 | 3a | — | — | — | 2 | — | — | — | — | ... |
| 102 | 3b | 2 | 3a | — | 3a | — | 2 | 1 | — | −80 | — | ... |
| 103(ACK) | 2 | 3b | 3a | — | — | — | 0 | — | — | — | — | ... |
| 104(ACK) | 2 | 3b | 3a | — | 3a | — | 0 | 1 | — | −80 | — | ... |

Thus the following positioning message 105 is sent and received not just by the zone 1 device 3a, but also by the controller 2.

| No  | Source | Destination | R0 | R1 | RR0 | RR1 | Z0 | Z1 | Z2 | RSSI0 | RSSI1 | Data |
|-----|--------|-------------|----|----|-----|-----|----|----|----|-------|-------|------|
| 105 | 3b     | 2           |    | 3a | —   | —   | —  | 2  | —  | —     | —     | …    |

The controller 2 now hears message 105 when it is first transmitted but because the recorded route (RR) field does not match the intended route (R) field, it can see that the message 105 has not yet travelled along its designated route.

The controller 2 can now check the strength of the received signal RSSI2 and if it is ok, i.e. above the threshold, it can send the acknowledgement 106 back along the new, direct route.

| No       | Source | Destination | R0 | R1 | RR0 | RR1 | Z0 | Z1 | Z2 | RSSI0 | RSSI1 | Data |
|----------|--------|-------------|----|----|-----|-----|----|----|----|-------|-------|------|
| 106(ACK) | 2      | 3b          | —  | —  | —   | —   | 0  | —  | —  | —     | —     | …    |

Device 3b has then received the acknowledgement directly and (having compared and confirmed that its received signal strength is above the threshold) will update its stored route information so that further messages will be transmitted directly to the controller 2. Since device 3b can determine from the message that it has been sent direct from the controller 2, it also determines that it is now in zone 1 and will likewise update its zone information, overwriting zone 2 with zone 1.

Figure 9:
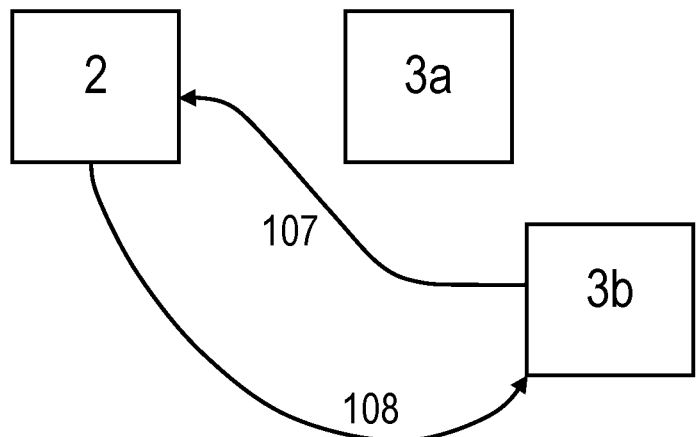
FIG. 9 is a schematic diagram showing transmission of messages between certain mesh networked devices shown in FIG. 1.

Referring to FIG. 9, future messages now continue as below with the new zone of device 3b, zone 1, shown.

| No       | Source | Destination | R0 | R1 | RR0 | RR1 | Z0 | Z1 | Z2 | RSSI0 | RSSI1 | Data |
|----------|--------|-------------|----|----|-----|-----|----|----|----|-------|-------|------|
| 107      | 3b     | 2           | —  | —  | —   | —   | 1  | —  | —  | —     | —     | …    |
| 108(ACK) | 2      | 3b          | —  | —  | —   | —   | 0  | —  | —  | —     | —     | …    |

Of course, since the new message 107 (and all further messages) from device 3b that was formerly in zone 2 now show as in zone 1, they will be ignored by any zone 1 devices, which will turn to an inactive mode, rather than forwarding the message and remaining active to forward the acknowledgement.

In the event that the device 3b is no longer in zone 1, e.g. if it moves back to zone 2, for example owing to a wall being replaced between the controller 2 and the device 3b, or a person moving back out of reach of the controller, it would receive no response to a polling message. In that case, it will wait for a period of time, for example 5 minutes and resend the message to double check, then after another predetermined period, say one minute further it can determine that it is no longer within reach.

Figure 6:
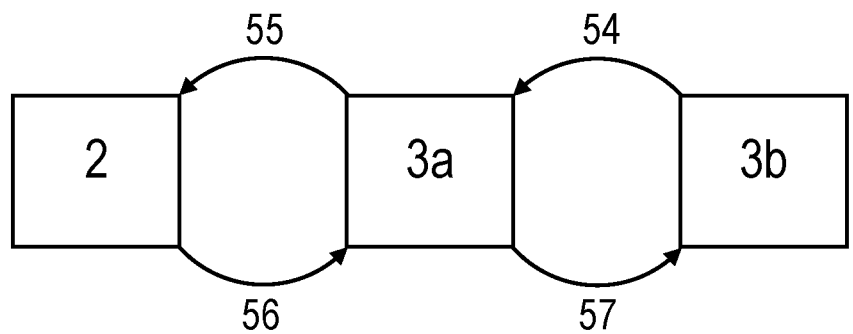
FIG. 6 is a schematic diagram showing transmission of messages between certain mesh networked devices shown in FIG. 1.

In that case, it can run the same process as in the setup, discussed above with reference to message 54 and FIG. 6, putatively assigning itself to zone 2 and sending a message to be forwarded by any zone 1 device 3, so as to determine its zone and a successful route that can be saved to memory for future use.

Example 2

Example 2 below, explains how the system operates for devices in three zones.

Figure 10:
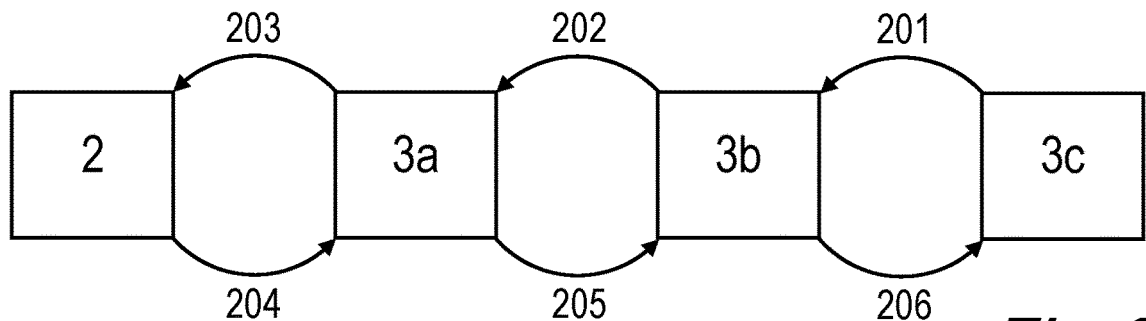
FIG. 10 is a schematic diagram showing transmission of messages between certain mesh networked devices shown in FIG. 1.

In this case, in ordinary operation as shown in FIG. 10, the following messages are sent:

| No       | Source | Destination | R0 | R1 | RR0 | RR1 | Z0 | Z1 | Z2 | RSSI0 | RSSI1 | Data |
|----------|--------|-------------|----|----|-----|-----|----|----|----|-------|-------|------|
| 201      | 3c     | 2           | 3b | 3a | —   | —   | 3  | —  | —  | —     | —     | …    |
| 202      | 3c     | 2           | 3b | 3a | 3b  | —   | 3  | 2  | —  | −80   | —     | …    |
| 203      | 3c     | 2           | 3b | 3a | 3b  | 15  | 3  | 2  | 1  | −80   | −80   | …    |
| 204(ACK) | 2      | 3c          | 3a | 3b | —   | —   | 0  | —  | —  | —     | —     | …    |
| 205(ACK) | 2      | 3c          | 3a | 3b | 3a  | —   | 0  | 1  | —  | −80   | —     | …    |
| 206(ACK) | 2      | 3c          | 3a | 3b | 3a  | 3b  | 0  | 1  | 2  | −80   | −80   | …    |

As the message travels along its designated route (R), the recorded route (RR) and zone information Z is populated by the forwarding devices.

The controller receives message 203 that has travelled along its intended route and therefore an acknowledgement (ACK) will be generated to this message which follows the same route back to the sender as shown by messages 204, 205 and 206.

Figure 11:
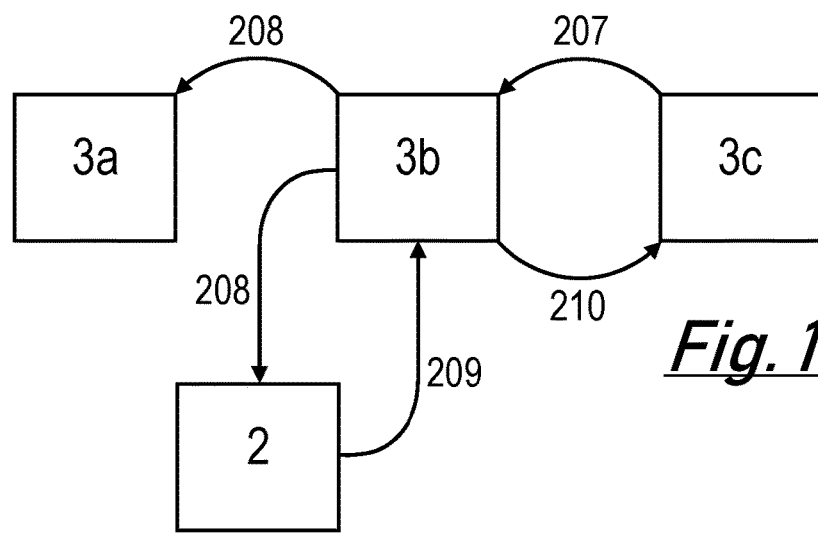
FIG. 11 is a schematic diagram showing transmission of messages between certain mesh networked devices shown in FIG. 1.

Now, as shown in FIG. 11, the same situation as in example 1 occurs where the controller becomes within range of device 3b in zone 2. Device 3c sends a polling and positioning message 207 as before.

This time the message 208 from the zone 2 device 3b is received by the controller 2 as well as the zone 1 device 3a. The controller checks that the signal strength of the received message 208 is in excess of the threshold and upon comparison finds it to be acceptable (at −80).

The controller 2 can see by comparing the intended route and recorded route fields that the positioning message from the zone 3 device 3c has not yet travelled the full length of its intended route.

It then checks the signal strength stored in the RSSI fields confirming that the other links are still at an acceptable level, above the threshold, and can therefore make the decision to reply on the available new route.

These are the messages in this situation:

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 207 | 3c | 2 | 3b | 3a | — | — | 3 | — | — | — | — | ... |
| 208 | 3c | 2 | 3b | 3a | 3b | — | 3 | 2 | — | −80 | — | ... |
| 209(ACK) | 2 | 3c | 3b | — | — | — | 0 | — | — | — | — | ... |
| 210(ACK) | 2 | 3c | 3b | — | 3b | — | 0 | 1 | — | −80 | — | ... |

Thus, it can be seen that having received a message direct from the controller 2, device 3b, formerly in zone 2, has compared the received message strength RSSI0 with the threshold and determined that it is high enough, and therefore updated its zone designation to zone 1 and its route for communication with the controller 2 to be direct. Accordingly, it has included its zone as "Zone 1" in the message to the formerly zone 3 device 3c.

Having received its acknowledgement along a route intended by the controller 2, and having compared and confirmed that the signal strength of the message it received is above the threshold, device 3c, formerly in zone 3, updates its zone designation to "Zone 2" and saves the route along which the signal has travelled (via device 3b only), to its memory for future polling and positioning messages to the controller 2.

Figure 12:
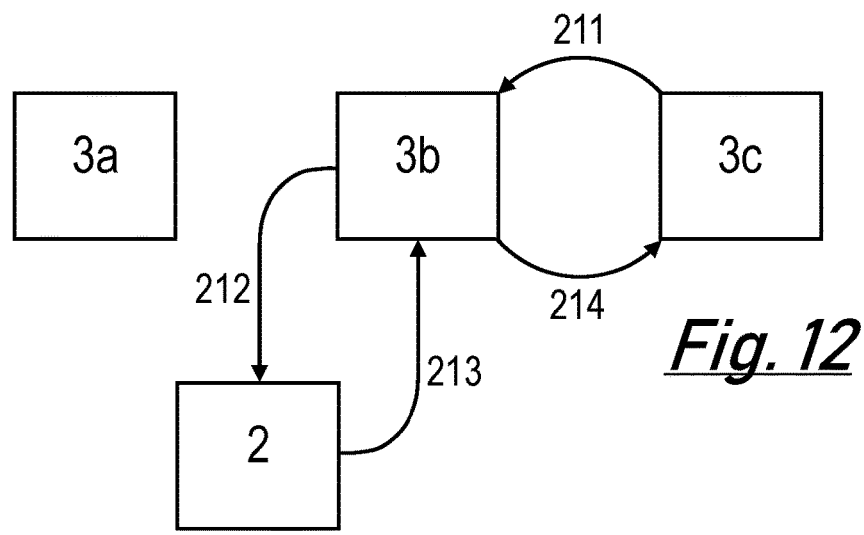
FIG. 12 is a schematic diagram showing transmission of messages between certain mesh networked devices shown in FIG. 1.

Future messages will therefore be as follows (with reference to FIG. 12)

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 211 | 3c | 2 | 3b | — | — | — | 2 | — | — | — | — | ... |
| 212 | 3c | 2 | 3b | 3b | — | — | 2 | 1 | — | −80 | — | ... |
| 213(ACK) | 2 | 3c | 3b | — | — | — | 0 | — | — | — | — | ... |
| 214(ACK) | 2 | 3c | 3b | — | 3b | — | 0 | 1 | — | −80 | — | ... |

Turning back to the situation discussed at the beginning of the example with reference to FIG. 10, in which device 3a is in zone 1, device 3b is in zone 2 and device 3c is in zone 3, the inventive arrangement is capable of dealing not just with changing zones where the controller 2 discovers that it is within reach of a formerly zone 2 device 3, but the same would occur if it discovered it was within reach of a formerly zone 3 device, and owing to the manner in which the devices themselves behave, they can even alter their zone information without instruction from the controller 2, as set out below.

Figure 13:
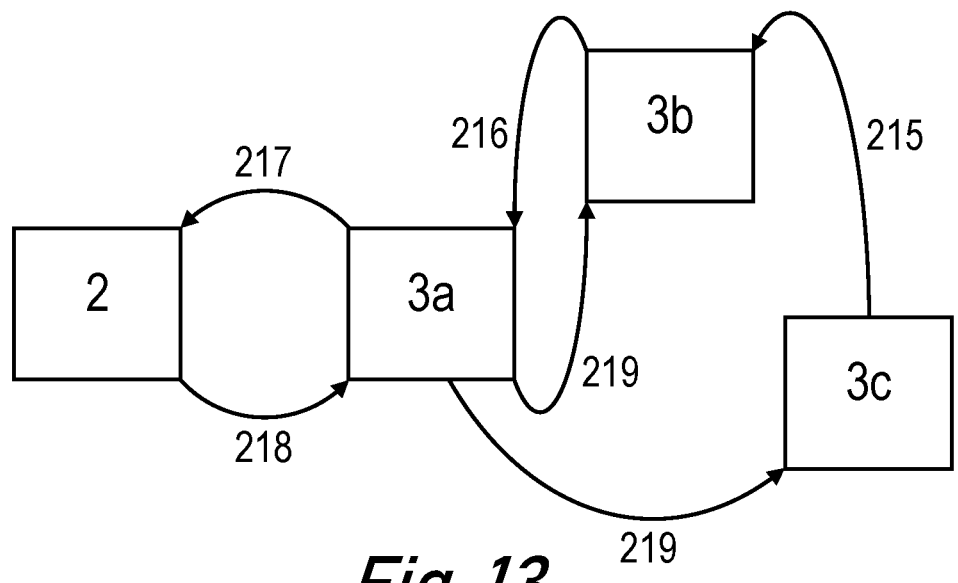
FIG. 13 is a schematic diagram showing transmission of messages between certain mesh networked devices shown in FIG. 1.

In the situation now described with reference to FIG. 13, the sending of a polling message, which is as usual also a positioning signal, comprising the necessary information to determine position, begins as usual, with messages 215, 216, 217 and 218 shown below being identical to messages 201, 202, 203 and 204 respectively, as shown below.

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 215 | 3c | 2 | 3b | 3a | — | — | 3 | — | — | — | — | ... |
| 216 | 3c | 2 | 3b | 3a | 3b | — | 3 | 2 | — | −80 | — | ... |
| 217 | 3c | 2 | 3b | 3a | 3b | 15 | 3 | 2 | 1 | −80 | −80 | ... |
| 218(ACK) | 2 | 3c | 3a | 3b | — | — | 0 | — | — | — | — | ... |
| 219(ACK) | 2 | 3c | 3a | 3b | 3a | — | 0 | 1 | — | −80 | — | ... |

However, in this example, device 3c has moved closer to the zone 1 device 3a and therefore, it receives the acknowledgement message 219 from the device 3a, which is designated "Zone 1" and comparing R0 and R1 with RR0 and RR1 can determine that the message has not travelled along its intended route, but has passed through a shorter route via fewer intermediate devices.

Accordingly, device 3c, the source of the original positioning message, compares the received signal strength of the message received from device 3a with the threshold and, having determined that it is above the threshold (and that the other signal strength along the route is above the threshold) determines that it is capable of communicating with the zone 1 device 3a, and therefore saves the successful route from the controller 2 as the route for further communication with the controller 2, and saves its new zone designation "Zone 2" to memory, such that it is now able and arranged to communicate as a zone 2 device.

Figure 14:
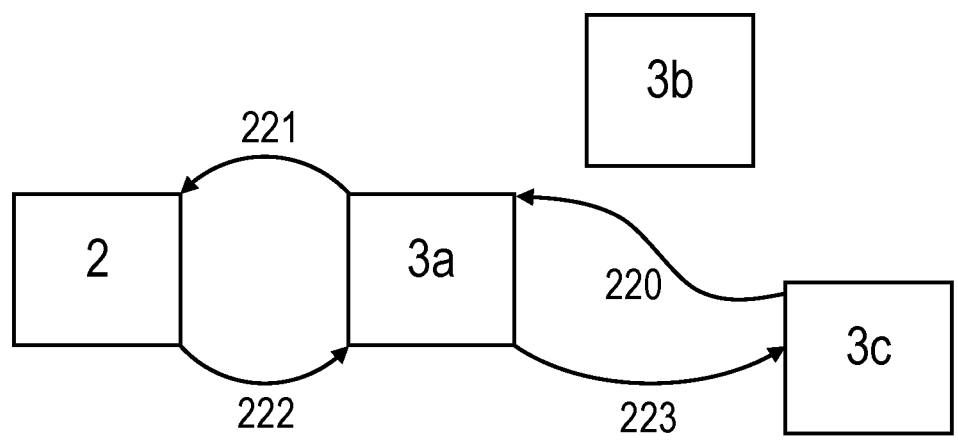
FIG. 14 is a schematic diagram showing transmission of messages between certain mesh networked devices shown in FIG. 1.

Consequently, future messages will be sent as shown in FIG. 14 and set out below:

| No | Source | Destination | R0 | R1 | RR0 | RR1 | Z0 | Z1 | Z2 | RSSI0 | RSSI1 | Data |
|---|---|---|---|---|---|---|---|---|---|---|---|---|
| 220 | 3c | 2 | 3a | — | — | — | 2 | — | — | — | — | ... |
| 221 | 3c | 2 | 3a | — | 3a | — | 2 | 1 | — | −80 | — | ... |
| 222(ACK) | 2 | 3c | 3a | — | — | — | 0 | — | — | — | — | ... |
| 223(ACK) | 2 | 3c | 3a | — | 3a | — | 0 | 1 | — | −80 | — | ... |

As set out above, the positioning information is sent with every message from every device; the devices sending messages periodically, some messages being sent regularly, such as polling messages, and other messages being sent occasionally, such as signals instructing devices to arm, or indicating the trigger of an alarm. In consequence, every time a message is sent, if the positioning of devices has changed, due to movement or other issues, the zoning can be improved, with devices being set at lower zones, reducing the power consumption of the mesh network as a whole since devices not involved in the forwarding of messages can be turned to an inactive state.

Of course, those skilled in the art will appreciate (in light of the above) that whilst every message being a positioning message is ideal, it is not a necessity, so, for example, the system could work well with only polling messages being positioning messages.

Indeed certain types of devices might send messages or change zones more frequently than others. For example, certain devices may be temporary, moveable devices such as man-down devices, which are likely to change position regularly and should therefore send positioning signals as frequently as possible, whereas other devices, such as fixed sensors might be less likely to change zones (movement of such sensors typically being infrequent) and might therefore send the positioning signals more irregularly, say only on an hourly, daily, weekly or monthly basis, unless there is a specific need to find their position, i.e. in the event that a polling signal is not acknowledged.

The behaviour of the controller 2 can also be different for a supervised vs unsupervised device 3, periodically receiving a message indicative of the online/offline status of the supervised devices and reacting to an unexpected offline status by adding a count to a counter, which may trigger an alarm once a certain count has been reached; to sound an alarm; to send a notification; or to send a polling message to the device that has an unexpected offline status.

Additionally, the system might include additional unsupervised wireless network devices which might be temporarily or permanently installed and only used occasionally for example for performing diagnostics. Such devices might only communicate very infrequently, and so could do so without causing too much additional traffic, even if they are not necessarily assigned the closest possible zone to the controller, with that zone updated as frequently as possible. Other exemplary unsupervised devices temporary (readily moveable) devices such as a key-fob, or a hand-held device, comprising a screen and an input, for example provided as a mobile telephone programmed with a suitable application—these might only be polled infrequently, e.g. if lost and via a broadcast message, and might, therefore, not need to keep track of their zone.

The above embodiments are described by way of example only. Many variations are possible without departing from the scope of the invention as defined in the appended claims.

The invention claimed is:

1. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device; wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein ability to communicate with the controller or another networked device is determined by measuring the strength of a signal to/from the controller or other networked device; wherein the measured strength is compared to a predetermined threshold signal strength and ability to communicate is determined when the measured strength is equal to, or exceeds the threshold, and wherein the controller is configured to receive a positioning message, compare a received signal strength with a threshold and send an acknowledgement only if the signal strength is above the threshold.

2. A mesh network according to claim 1 wherein at least 50% of all messages sent from one or more or each device to the controller comprises a positioning message.

3. A mesh network according to claim 1 wherein one or more or each device sends a positioning message at least once per day.

4. A mesh network according to claim 1 wherein the positioning message is populated by any intermediate devices to comprise the received signal strength indicating the signal strength of the message received by each such intermediate device.

5. A mesh network according to claim 1 which is an alarm network.

6. A mesh network according to claim 1 wherein the networked devices comprise sensors.

7. A mesh network according to claim 1 wherein the networked devices are arranged in zones such that a device which is not able or arranged to connect directly with the controller, nor via a "Zone 1" device, but is able and arranged to communicate with the controller via a "Zone 2" device is designated a "Zone 3" device; and wherein one or more or each of the plurality of devices periodically send a positioning message to the controller to determine its zone and if it is not able to communicate directly with the controller or a "Zone 1" device, but is able to communicate with the controller via a "Zone 2" device, it determines that it is a "Zone 3" device.

8. A controller for a mesh network according to claim 1, the controller configured to periodically receive a positioning message from a source device in the mesh network to determine the zone of the source device;
the positioning message comprising: source information identifying the device that is the source of the positioning message; optionally destination information identifying the controller as the destination that the positioning message is destined for; intended route information indicating the route that the message is intended to take; recorded route information populated by any one or more intermediate device between the source and the destination that forwards the message and identifying each of said one or more intermediate devices; and the designated zone of the source device;
the controller configured to compare the intended route with the recorded route and where the recorded route is shorter than the intended route, to compare the received signal strength to a threshold, and where the received signal strength is above the threshold, to send an acknowledgement along the recorded route, such that the source device and any intermediate devices can update their zone designation.

9. A wireless network device for a mesh network according claim 1, the device configured to periodically send a positioning message to the controller to determine its zone;
the positioning message comprising source information identifying the device that is the source of the positioning message; optionally destination information identifying the controller as the destination that the positioning message is destined for; and intended route information indicating the route that the message is intended to take; and the designated zone of the source device;
the device configured to receive an acknowledgement message from the controller, the acknowledgement message comprising acknowledgement-source information identifying the controller as the source of the acknowledgement message; intended acknowledgement-route information identifying the route that the acknowledgement message is intended to take, and recorded acknowledgement-route information identifying the recorded route that the message has taken from the controller to the device;
the wireless network device configured to compare the recorded acknowledgement route with the intended route of the positioning message and where the recorded acknowledgement route is shorter than the intended route, to compare the received signal strength to a threshold, and where the received signal strength is above the threshold, to update its zone designation based on the number of intermediate devices, if any, between the device and the controller, such that if it received the acknowledgement direct from the controller it determines that it is a "Zone 1" device and if it received the acknowledgement via a "Zone 1" device it determines that it is a "Zone 2" device.

10. A wireless network device according to claim 9 which is configured store the new zone designation to memory; and wherein the wireless network device is configured to store the recorded route to memory as a new intended route for future transmission from the device to the controller; and wherein the wireless network device is configured to periodically send a polling message to the controller comprising the positioning message; and wherein the wireless network device is configured such that every message sent from the device to the controller comprises a positioning message.

11. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device; wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein one or more or each device is configured to periodically send a polling message to the controller including data such as the status of said device; wherein the one or more or each polling message comprises a positioning message, and wherein the controller reacts to one or more or every polling message by comparing the received signal strength with a threshold and sending an acknowledgement if the signal strength is above the threshold.

12. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;
wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein each device is configured to compare the zone of the source device, the zone of the destination and their own zone designation, and where the zone of the destination is lower than the zone of the source, to ignore, and not forward the message, and optionally turn to an inactive state, if their own zone designation is equal to, or higher than, the zone of the source.

13. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device; wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein each device is configured to compare the zone of the source device, the zone of the destination and their own zone designation, and where the zone of the destination is higher than the zone of the source, to ignore, and not forward the message, and optionally turn to an inactive state, if their own zone designation is equal to, or lower than, the zone of the source.

14. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;
  wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein each device waits for a predetermined period after sending each positioning message, after a predetermined number of consecutive absences of acknowledgement, determines that it is no longer in its designated zone, nor a lower zone; and wherein having determined that it is no longer in its designated zone, but is not in a lower zone, the device increments its zone designation then resends a positioning message to the controller comprising its new putative redesignated zone.

15. A wireless mesh network Comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;
  wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein one or more or each positioning message comprises: source information identifying the device that is the source of the positioning message; destination information identifying the apparatus that the positioning message is destined for; intended route information indicating the route that the message is intended to take; optionally recorded route information populated by any one or more intermediate device between the source and the destination that forwards the message and identifying each of said one or more intermediate devices; and the designated zone of the source device; wherein the positioning message further comprises the designated zone of each intermediate device, and wherein intended route information comprises identifiers identifying any intermediate devices intended to forward the positioning message, and wherein the intended route information identifying intermediate devices intended to forward the positioning message is generated based on the last successful message sent from the destination to the source, and wherein each device is configured to compare the zone of the source device, the zone of the destination, their own zone designation and the zone of the sending device which sent the message to said each device; and where the zone of the destination is lower than the zone of the source, to ignore, and not forward the message, and optionally turn to an inactive state, if their own zone designation is equal to, or higher than, the zone of the sending device, or if their zone is only one less than the sending device and they are not an intermediate device identified, and wherein each device is configured to compare the zone of the source device, the zone of the destination, their own zone designation and the zone of the sending device which sent the message to said each device; and where the zone of the destination is higher than the zone of the source, to ignore, and not forward the message, and optionally turn to an inactive state, if their own zone designation is equal to, or lower than, the zone of the sending device, or if their zone is only one more than the sending device and they are not an intermediate device identified.

16. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;
  wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein the controller is configured to send an acknowledgement message in response to the positioning message, to the device that was the source of the positioning message; and wherein the device that was the source of the positioning message is configured to determine its zone on the basis of the acknowledgement message; and wherein the device that was the source of the positioning message is configured to confirm or redetermine its zone on the basis of the acknowledgement message and to save its designated zone to memory, and wherein the acknowledgement message comprises an intended route from the controller to the device that was the source of the positioning message; the intended route being the recorded route from the source device to the controller.

17. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;

wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, which is configured such that the controller receives a positioning message directly from one of the devices defined as a source device that is designated a "Zone 2" device, the message comprising source information identifying the device that is the source of the positioning message; destination information identifying the controller that the positioning message is destined for; intended route information indicating the route that the message is intended to take and including the information identifying a "Zone 1" device intended to forward the message; and no recorded route information populated by any such intermediate device between the source and the destination; and the designated zone, "Zone 2", of the source device; the controller being configured to compare the intended route information with recorded route information, and having determined that they are different, to compare received signal strength with a threshold, and configured to determine that the received signal strength is above a threshold and accordingly to send an acknowledgement message direct to the source device; wherein the acknowledgement message comprises an intended route from the controller to the device that is the recorded route direct between the device and the controller; whereby, on receipt of the acknowledgement direct from the controller, with no fields populated by intermediate devices, the source device updates its zone designation, such that it is designated a Zone 1 device.

18. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;

wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein the plurality of networked devices comprise supervised devices and at least one non-supervised device and the controller periodically receives a message indicative of the online/offline status of the supervised devices and reacts to an unexpected offline status.

19. A wireless mesh network comprising a controller and a plurality of wireless networked devices arranged to transmit messages to and receive messages from the controller, wherein the plurality of networked devices are arranged in zones, such that a device that is arranged to communicate directly with the controller is designated a "Zone 1" device and a device that is arranged to communicate with the controller via a "Zone 1" device is designated a "Zone 2" device;

wherein, one or more or each of the plurality of devices periodically sends a positioning message to the controller to determine its zone and if it is able to communicate directly with the controller it determines that it is a "Zone 1" device and if it is not able to communicate directly with the controller, but it is able to communicate with the controller via a "Zone 1" device and therefore arranged to do so, it determines that it is a "Zone 2" device, wherein the plurality of networked devices comprises permanent supervised devices and at least one temporary device; and wherein the temporary device, or each of a plurality of temporary devices periodically sends a positioning message to the controller to determine its zone and the permanent devices also periodically send a positioning message to the controller to determine their respective zones; and wherein the period between positioning messages is shorter for temporary devices than for permanent devices, and wherein at least one temporary device is a temporary unsupervised device, and at least one temporary device is a temporary supervised device, for example a "man-down" device; and wherein the reaction to the unexpected offline status is to add a count to a counter, and to trigger an alarm once a certain count has been reached.

* * * * *